US012589476B2

(12) United States Patent
Villarino, III

(10) Patent No.: US 12,589,476 B2
(45) Date of Patent: Mar. 31, 2026

(54) STRIKING TOOL

(71) Applicant: Ernest R. Villarino, III, San Diego, CA (US)

(72) Inventor: Ernest R. Villarino, III, San Diego, CA (US)

( * ) Notice: Subject to any disclaimer, the term of this patent is extended or adjusted under 35 U.S.C. 154(b) by 379 days.

(21) Appl. No.: 18/116,585

(22) Filed: Mar. 2, 2023

(65) Prior Publication Data

US 2023/0202014 A1 Jun. 29, 2023

Related U.S. Application Data

(63) Continuation-in-part of application No. 16/852,775, filed on Apr. 20, 2020, now Pat. No. 11,607,796.

(51) Int. Cl.

*B25D 1/02* (2006.01)
*B25D 1/04* (2006.01)
*B25D 1/06* (2006.01)
*B25G 3/26* (2006.01)

(52) U.S. Cl.

CPC ............... *B25D 1/02* (2013.01); *B25D 1/045* (2013.01); *B25D 1/06* (2013.01); *B25G 3/26* (2013.01)

(58) Field of Classification Search

CPC . B25D 1/02; B25D 1/04; B25D 1/045; B25D 1/06; B25D 1/10; B25D 1/12; B25D 2250/015; B25G 1/02; B25G 1/10; B25G 3/12; B25G 3/26; B25F 1/006

See application file for complete search history.

(56) References Cited

U.S. PATENT DOCUMENTS

| | | | | |
|---|---|---|---|---|
| 1,807,347 | A * | 5/1931 | Schweigert | B25D 1/02 D8/78 |
| 1,923,964 | A | 8/1933 | Benton | |
| 6,435,059 | B1 | 8/2002 | Martinez | |
| 6,536,308 | B1 | 3/2003 | Thorne et al. | |
| 6,655,236 | B1 | 12/2003 | Slack et al. | |
| 6,899,001 | B1 | 5/2005 | Sanders et al. | |
| 8,770,548 | B2 * | 7/2014 | Hanlon | B25G 1/102 81/22 |
| 9,707,676 | B2 * | 7/2017 | Chapman | B25H 3/006 |
| 9,718,179 | B1 | 8/2017 | Martinez | |
| D922,846 | S | 6/2021 | Villarino, III | |
| 2004/0261188 | A1 | 12/2004 | Mathis | |
| 2012/0091409 | A1 | 4/2012 | Hanlon | |
| 2015/0251302 | A1 | 9/2015 | Flosi et al. | |
| 2018/0207780 | A1 * | 7/2018 | Hung | B25D 1/04 |
| 2019/0084141 | A1 | 3/2019 | Keast et al. | |
| 2019/0255691 | A1 * | 8/2019 | Paulsen | B25G 3/14 |

FOREIGN PATENT DOCUMENTS

| | | | |
|---|---|---|---|
| CA | 2381762 | C | 8/2005 |
| KR | 20180063790 | A | 12/2018 |
| MX | PA02001538 | A | 7/2002 |
| WO | 01/12392 | A1 | 2/2001 |

* cited by examiner

*Primary Examiner* — Robert J Scruggs
(74) *Attorney, Agent, or Firm* — Kelly & Kelley, LLP

(57) ABSTRACT

A striking tool head assembly is detachably connected to a handle. The assembly includes multiple components, including a head body having an open-ended internal cavity configured to receive an end of the handle therein and a striking portion extending from the head body. A striking member is detachably connected to a free end of the striking portion. A claw member is detachably connected to an upper surface of the head body. The claw member defines spaced-apart first and second elongated claw portions.

24 Claims, 12 Drawing Sheets

STRIKING TOOL

RELATED APPLICATIONS

This application is a continuation-in-part of U.S. application Ser. No. 16/852,775, filed Apr. 20, 2020.

FIELD OF THE INVENTION

The present invention relates generally to hand-held striking tools, such as hammers and the like, that comprise a handle which is gripped by the user and a head that has at least one striking portion. More particularly, the present invention relates to a striking tool head assembly which is detachably connected to a handle of the striking tool.

BACKGROUND OF THE INVENTION

Hand-held striking tools have been in use for a very long time and are available in a wide variety of different configurations which are beneficially constructed and selected to accomplish one or more striking tasks. Such tools comprise a handle having a lower end and an upper end and a head that is either attached to or integral with the handle, typically at or near the upper end thereof. A gripping portion of the handle is sized and configured to be comfortably and safely held in the hand of the user so the user can swing the handle with his or her arm to direct the head of the tool to where the work is to be accomplished. The head of the striking tool is generally structured and arranged to accomplish the desired striking or other work objective. One common configuration for a striking tool is as a hammer with the head comprising at least one striking surface that is selected to contact a work object and achieve the desired work objective, which may be to drive the work object into another object, reshape the object, break the object into smaller pieces or like tasks.

With regard to striking tools that are configured as a hammer, there are a wide variety of different types of hammers. Perhaps the most common type of hammer is the claw hammer, which is utilized by millions of professional and non-professional carpenters and other construction workers throughout the world. The head of the typical claw hammer has a striking portion at one end and a claw portion at the opposite end. The striking portion of the head has an outwardly disposed striking face that is directed at and makes contact with the object, such as the head of a nail or the like, for which the striking tool is being utilized to accomplish a particular work objective, such as driving the nail into a piece of wood. The striking face may be planar or have a slight curvature thereto.

Typically, the head of a striking tool is made out of hardened steel or other very hard metals, usually by a casting or forging process, to provide a striking portion, claw portion, pick portion or other portions which are sufficiently rigid and impact resistant to allow the user to provide the necessary force with the striking tool to accomplish the desired work objective. More recently, striking tool heads have also been made out of lighter weight materials, such as titanium and titanium-based alloys, that are sufficiently strong enough to accomplish the desired striking objectives but reduce the weight of the portion of the tool that is swung by the user. In addition to being easier to carry and swing, the use of a lighter weight head increases the speed of the head as it arcs through its swing path to provide a greater amount applied force at the striking face or at the other desired striking portion of the tool. Compared to hardened steels and the like, titanium is a softer material. As a result, the impact force against the striking portion of the head can result in wear and distortion, particularly at or near the striking face.

The claw portion of the hammer typically comprises a pair of outwardly extending, divergently spaced apart claw members that are structured and arranged to be received under the head of a nail in a manner that allows the user of the claw hammer to apply leverage to the nail to pull or pry the nail out from where it was previously placed. The nail puller comprises a pair of nail engagement edges and an opening into the hammer head. The opening is designed such that the head of the nail being pulled will fit inside the opening so the nail engagement edges will engage the underside of the nail head. The user pulls the nail out of the object by laying the hammer head next to the nail head, sliding the nail engagement edges under the nail head and then rotating the hammer head to pull the nail out of the object.

The handle of a typical striking tool, including hammers, is sized and configured for the user to securely, safely and comfortably grip the striking tool and to maintain that grip as he or she swings the tool and contacts the head of the tool against an object. The handle of a hammer can be made out of wood, polymers and a variety of metals, including steel, aluminum, titanium and the like. Depending on the material utilized for the handle, the lower section thereof may be coated, covered, imbedded with or otherwise comprise a gripping material that provides the user with the ability to better grip the handle, swing the tool and absorb the contact with the object being hit.

Wood is a material that typically comprises the handle striking tool. Wood is relatively inexpensive and lightweight. However, wood handles are prone to becoming damaged over time resulting in the striking tool being rendered ineffective. Typically, the striking portion of the striking tool, such as the hammer, is either integrally formed with the handle or connected to the handle in such a way that that the handle is not replaceable, and instead the entire striking tool must be replaced.

Despite the various advantages of the prior art with regard to improved configurations for striking tools, there remains a need for further improvements to striking tools. Specifically, with regard to the striking member of the striking tool, there is a need to be able to separately replace the striking member of the striking tool. As well known by persons skilled in the art, often the striking member of the striking tool will prematurely wear or become damaged so it is no longer useable, such as the striking portion becoming misshaped, while the other portion of the tool is still useable. Similarly, when the handle becomes damaged, it can adversely impact the use of the striking tool. Presently, it is common that the entire striking tool is replaced. Accordingly, there is a continuing need for an improved striking tool. The present invention fulfills these needs and provides other related advantages.

SUMMARY OF THE INVENTION

The present invention resides in a striking tool head assembly detachably connected to a handle. The assembly generally comprises a head body having an open-ended internal cavity configured to receive an end of the handle therein. The internal cavity of the head body may extend from a bottom surface to a top surface of the head body. A striking portion extends from the head body.

A striking member is detachably connected to a free end of the striking portion of the head body. A passageway may extend through the head body and the striking portion configured to receive a striking member fastener there-through for detachably connecting the striking member to the striking portion of the head body.

The striking member has a striking face and a perimeter apron wall that extends therefrom and over an end portion of the striking member when the striking member is attached to the striking portion. The striking portion may have a multi-faceted exterior surface. The striking member has a corresponding internal multi-faceted surface so as to fit over the striking portion.

The striking member may have a slot formed in a peripheral surface thereof configured to receive a nail therein. A magnet is associated with the slot for retaining the nail within the slot. The striking member may also include a notch having opposing edges formed in a peripheral surface of the striking member that forms a fastener puller.

A claw member is detachably connected to an upper surface of the head body. The claw member defines spaced-apart first and second elongated portion portions extending away from the head body generally opposite the striking member.

The claw member includes a platform portion disposed on an upper surface of the head body. The platform portion may have an aperture through which a claw member fastener extends into an aligned aperture of the head member for fastening the claw member to the head body. The platform portion of the claw member may also include an aperture through which a handle fastener extends into an end of the handle disposed within the cavity of the head body.

The claw member may include a ledge between the platform and the first and second claw portions that abut a rear surface of the head body. The claw member includes a gap between the first and second claw portions that narrows from a free end of the claw portions and forms a fastener puller.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
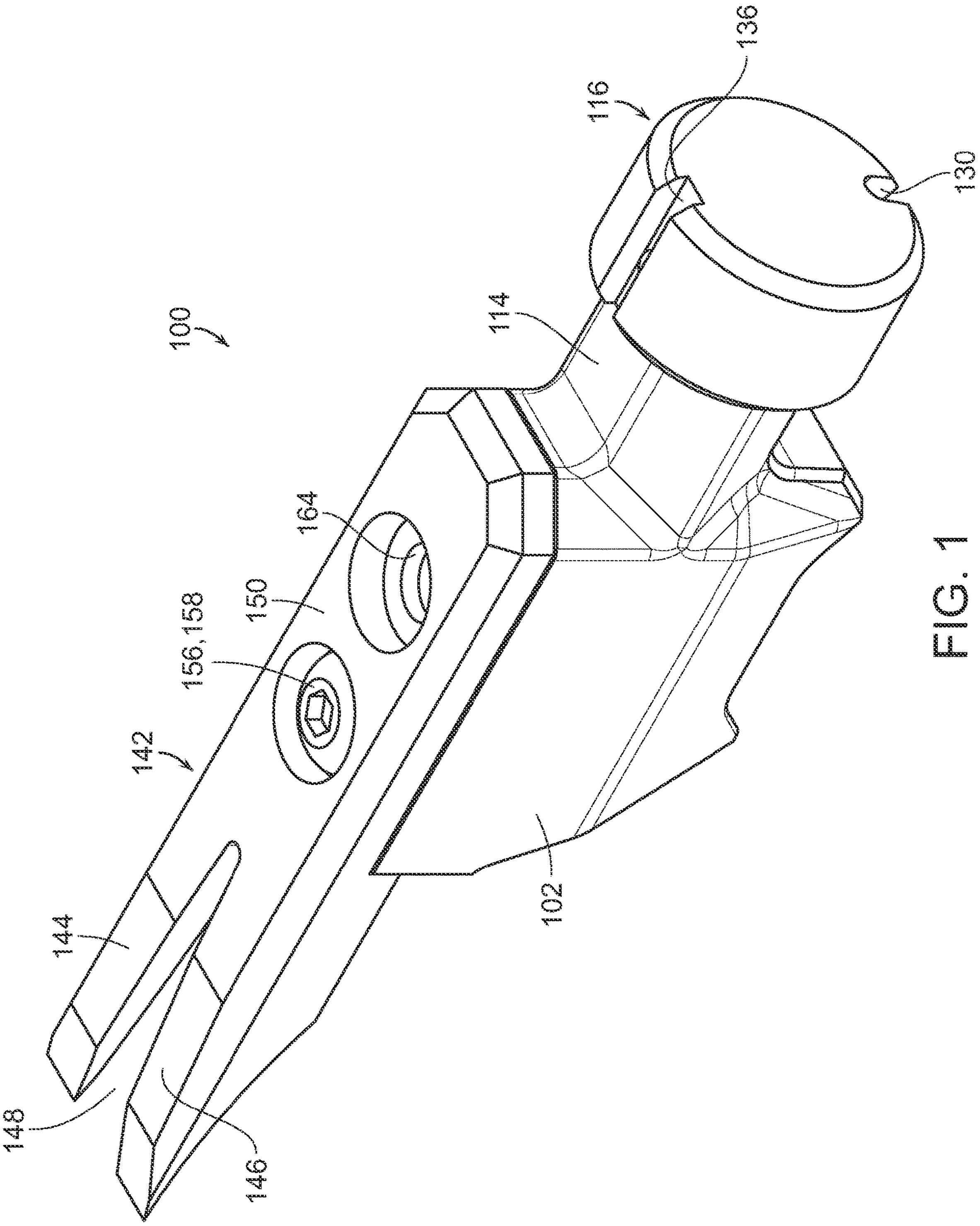
FIG. 1 is an upper side perspective view of an assembled striking tool head assembly embodying the present invention.

As shown in the accompanying drawings, the present invention is directed to a striking tool head assembly 100. The striking tool head assembly 100 is detachably connected to a handle to form a striking tool. The striking tool head assembly 100 is comprised of several components which are attached to one another and which can be swapped out as needed or desired, such as when the component becomes damaged.

The striking tool head assembly 100 may be comprised of any suitable material, but in particularly preferred embodiments, the striking tool head assembly 100 is comprised of a titanium alloy which is lightweight and provides strength. The striking tool head assembly 100 may also be comprised of steel. It is also contemplated by the present invention that the components of the striking tool head assembly 100 be comprised of differing materials.

With reference now to FIGS. 1-7, the striking tool head assembly 100 comprises a head body 102 having an open-ended internal cavity 104 that is configured to receive an end 12 of a handle 10 therein to attach the assembly 100 to the handle 10. The internal cavity 104 may extend from a lower surface 106 of the head body 102 to an upper surface 108 of the head body 102 so as to extend through the entirety of the head body 102. The internal cavity 104 at a lower portion adjacent the lower surface 106 of the head body 102 is sized and configured to at least receive the end 12 of the handle 10 therein. The end 12 of the handle 10 may extend partially into the head body 102 or completely to the upper surface 108 of the head body 102. Whereas the lower opening 110 of the cavity 104 is large enough to receive the end 12 of the handle 10 therein, the upper opening 112 of the cavity 104 may be smaller so that the end 12 of the handle 10 may not extend therethrough, but permit fastening of the assembly 100 to the handle 10, as will be more fully explained herein.

A striking portion 114 extends from the head body 102. Typically, the striking portion 114 extends from a front end of the head body 102. The striking portion 114 may be integrally formed with the head body 102 and comprised of the same material as the head body. In a particularly preferred embodiment, the striking portion 114 has a multi-faceted exterior configuration, as illustrated. While the striking portion 114 is illustrated herein as having six facets, it will be understood that fewer or more facets may be formed in the striking portion 114 while still achieving the objectives of the present invention, as more fully described herein.

A striking member 116 is detachably connected to a free end of the striking portion 114. In prior art striking tools, such as hammers, the striking face or striking member of the striking tool or hammer can become deformed and damaged over time. However, the entire hammer or striking tool would then have to be replaced when this occurred. However, in the present invention, the striking member 116 is removably attached to the striking portion 114 of the head body 102 so that if it becomes damaged it can be replaced without replacing the entire striking tool head assembly 100 or striking tool. Moreover, the striking member 116 may be comprised of a different material than the head body 102 and/or striking portion 114. For example, the striking member 116 may be comprised of a hardened steel or other hard material, such as titanium, which would resist damage. Alternatively, the striking member 116 may be comprised of a softer or more flexible material, if desired.

Figure 9:
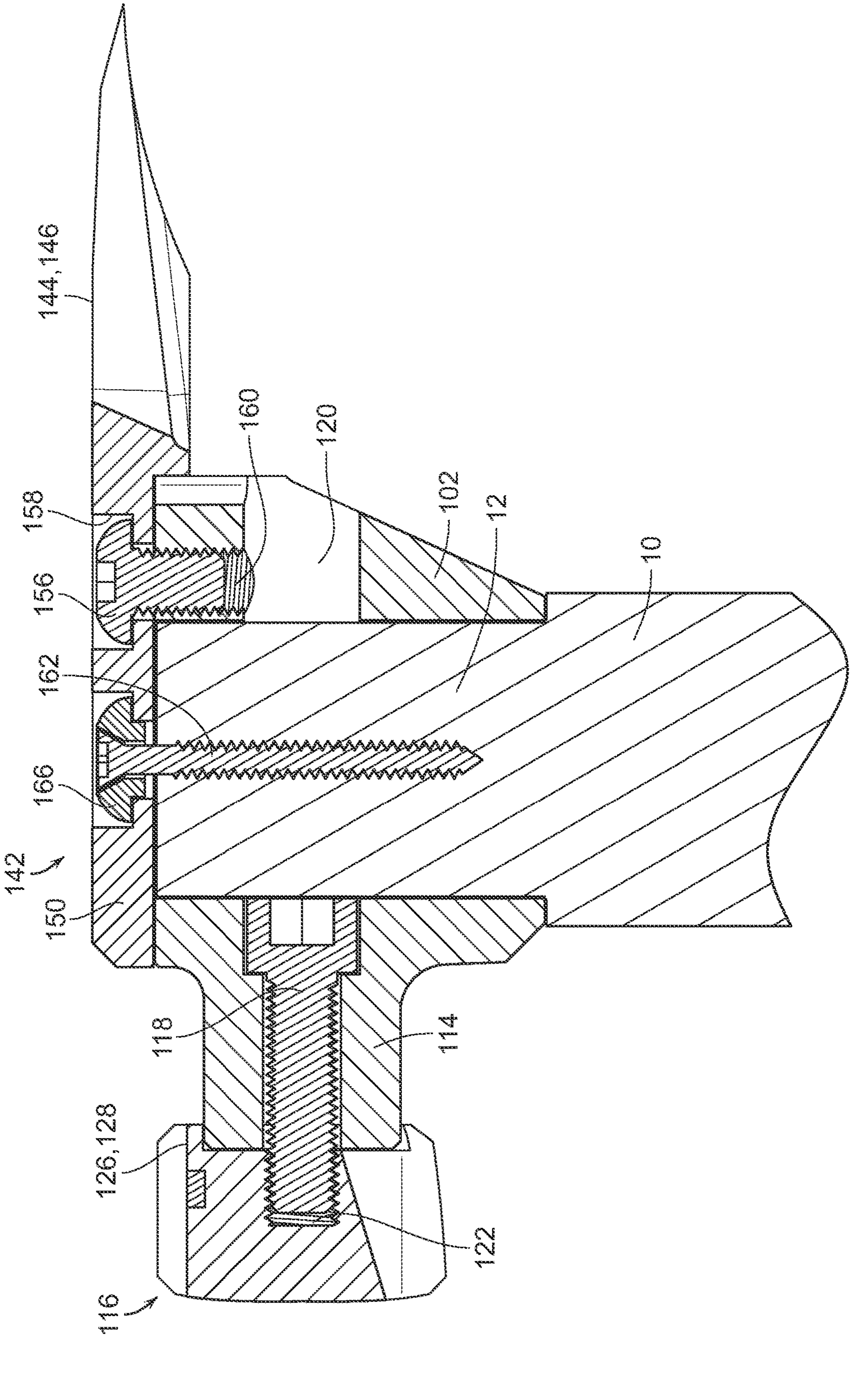
FIG. 9 is a cross-sectional view taken generally along line 9-9 of FIG. 8.
Figure 10:
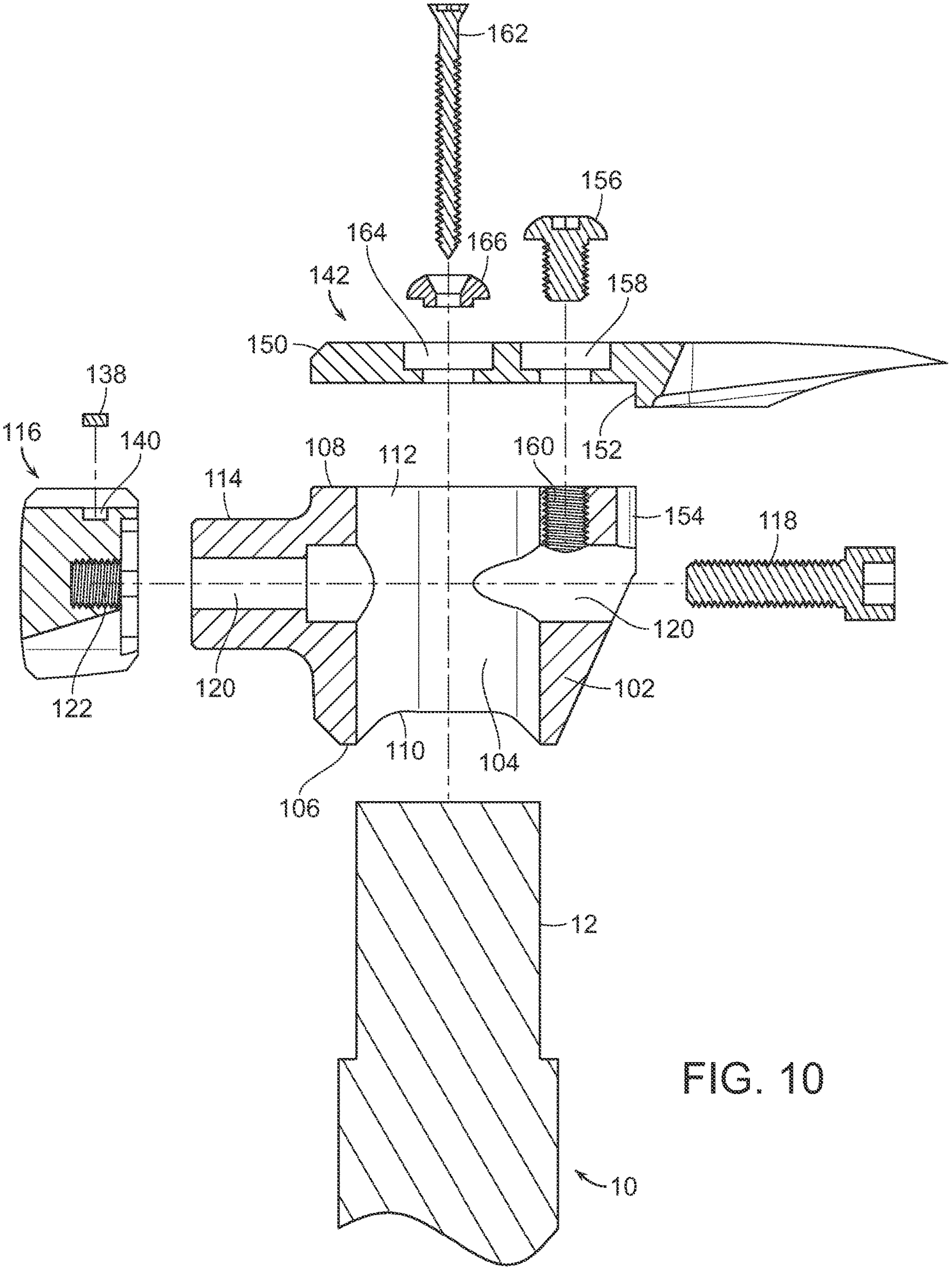
FIG. 10 is an exploded cross-sectional view illustrating the various components of the striking tool head assembly and an end of a handle.

With reference now to FIGS. 2, 7 and 9-12, the striking member 116 may be attached to the striking portion 114 by means of a striking member fastener 118. A passageway 120 may be formed through the striking tool assembly head body 102 and striking portion 114, generally through a rear end of the head body and through the striking portion 114 such that the fastener 118, such as the illustrated bolt, may be inserted into aperture 122 of the striking member 116 so that the striking member 116 may be fastened to the striking portion 114. Typically, the aperture 122 of the striking member 116 is internally threaded so as to threadedly receive the fastener 118. Thus, as the bolt or other fastener 118 is increasingly threadedly received into the internally threaded aperture 122 of the striking member 116, the striking member 116 is brought into contact with the striking portion 114. The passageway 120 through the head body 102 is sufficiently enlarged to permit a tool to be inserted therethrough to fasten the fastener 118 to the striking member 116. The portion of the passageway 120 through the striking portion 114, however, may be much smaller just so as to allow the threaded shank portion of the fastener 118 to pass therethrough, and an enlarged recessed area to receive the head of the fastener 118, as illustrated in FIGS. 9 and 10.

The striking member 116 includes a striking face 124 and a perimeter wall or apron 126 extending therefrom and which forms a cavity into which at least a portion of the striking portion 114 enters such that a portion of the wall or apron 126 extends over the end of the striking portion 114. The striking member 116 has an internal multi-faceted surface corresponding to the multi-faceted exterior surface of the striking member 114. This may be in the form of a beveled inner surface or ribbon 128 or the like, which may frictionally engage an outer surface of the striking portion 114 as the striking member 116 is fastened to the striking portion 114. Thus, a positive and very secure connection is made between the striking member 116 and the striking portion 114. Such an arrangement also prevents the striking member 116 from rotating with respect to the striking portion 114 during use and becoming unfastened. Instead, the striking member 116 will remain tightly fastened to the striking portion 114 as it is not possible for the striking member 116 to be rotated due to the external facets of the striking portion 114 and the internal facets 128 formed on the inner surface or ribbon of the striking member 116. Thus, the striking member 116 will not move or rotate in use.

The face 124 of the striking member 116 may be smooth or have a patterned face, such as having a waffle patterned face or the like. A patterned face can increase the friction when the striking member 116 strikes an object, such as a nail or the like, such that there is a more efficient transfer of energy thereto, while reducing slippage.

Figure 2:
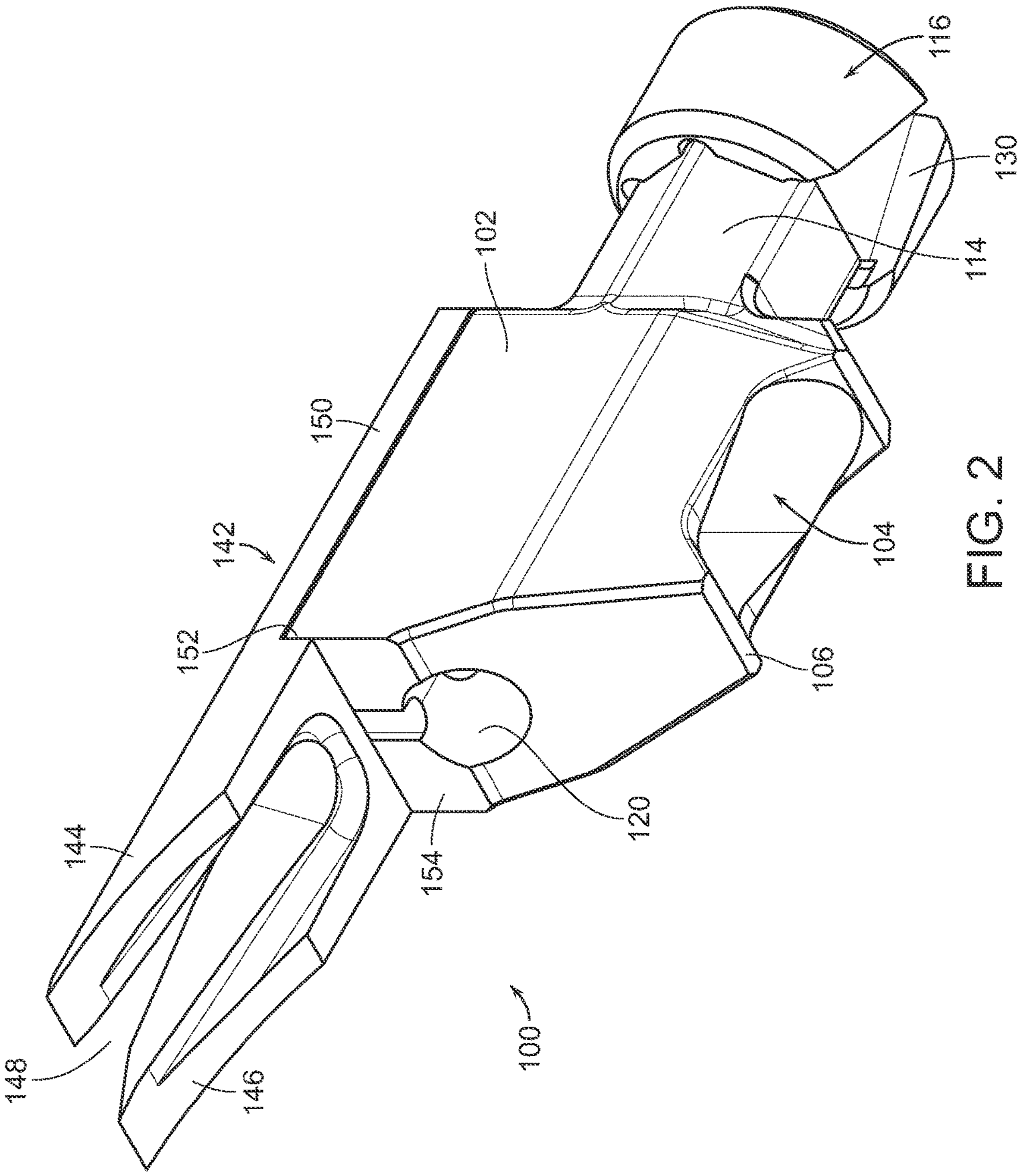
FIG. 2 is a lower side perspective view of the striking tool head assembly of FIG. 1.
Figure 3:
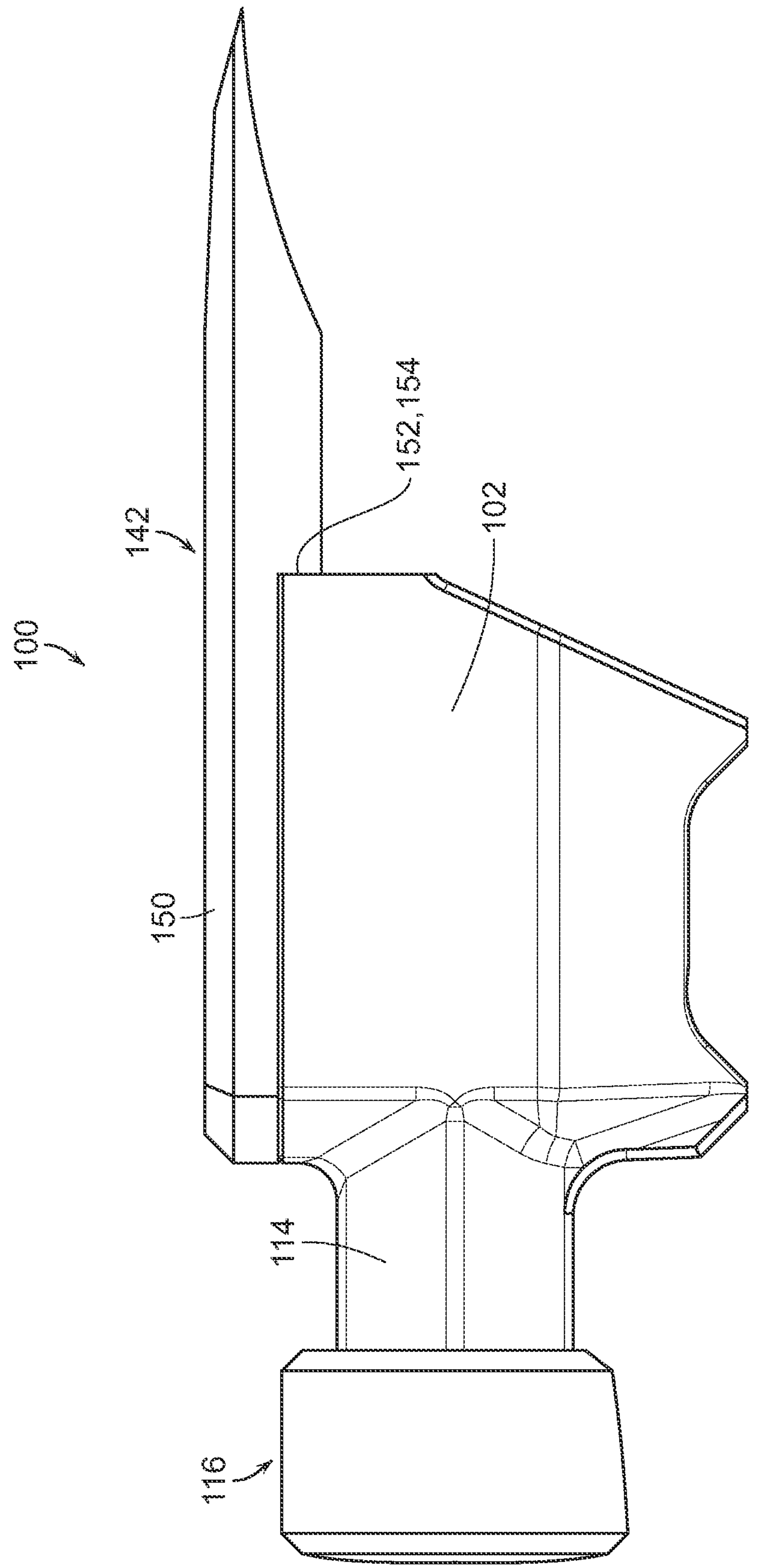
FIG. 3 is a side elevational view of the striking tool head assembly of the present invention.
Figure 5:
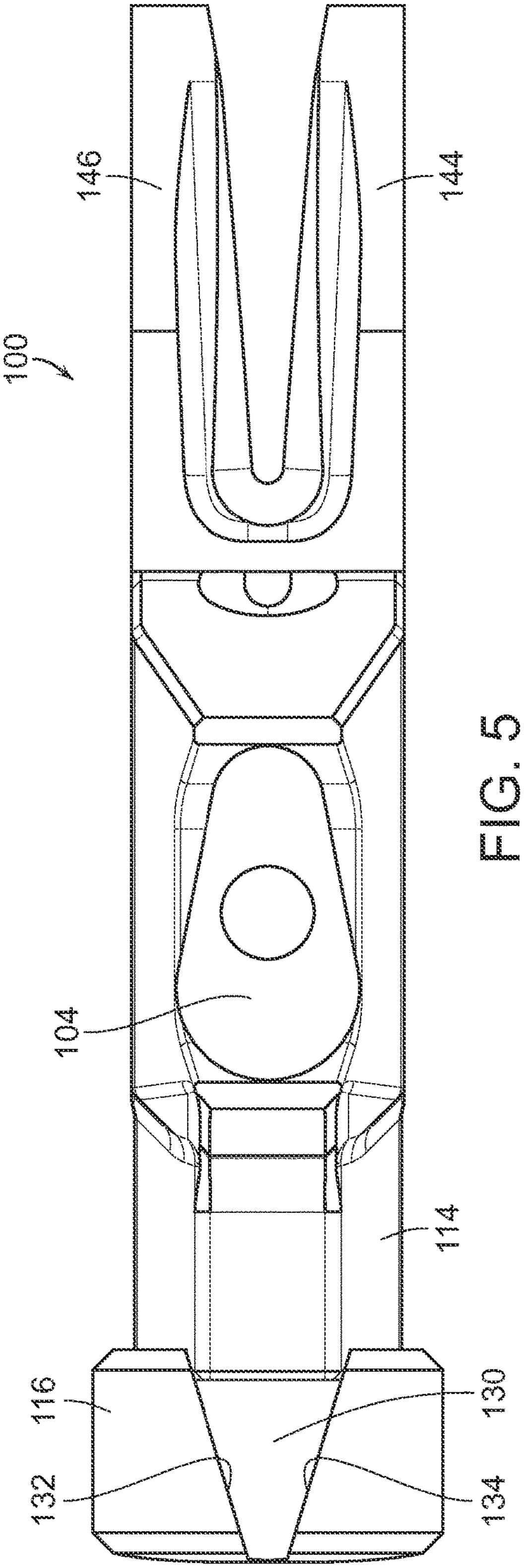
FIG. 5 is a bottom plan view of the striking tool head assembly of the present invention.
Figure 7:
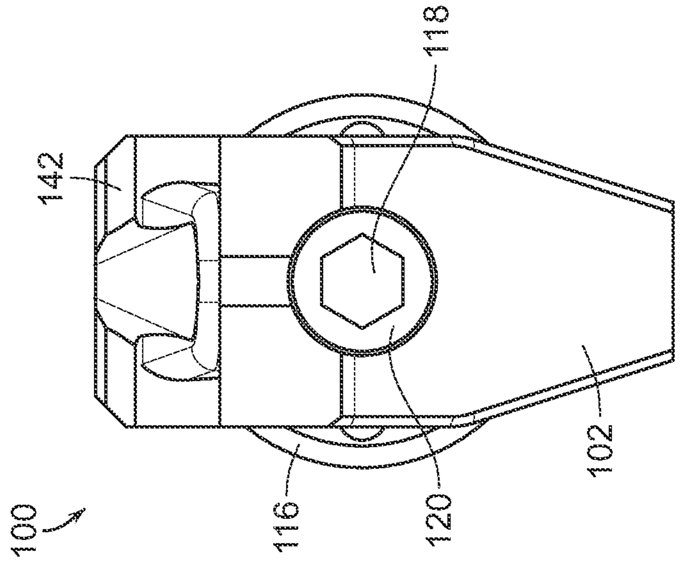
FIG. 7 is a rear view of the striking tool head assembly of the present invention.
Figure 6:
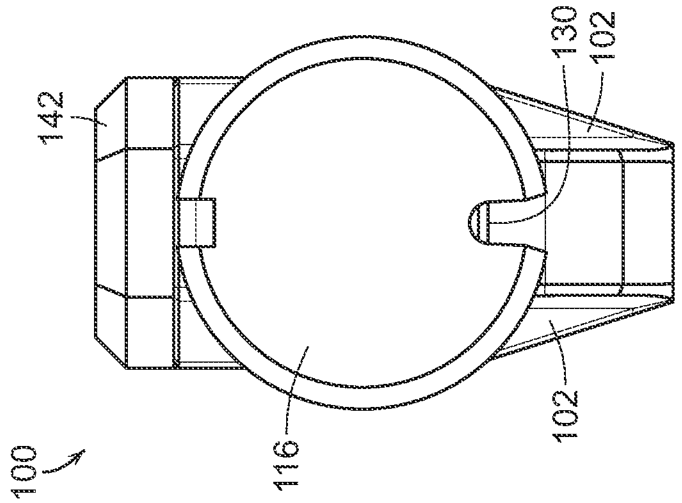
FIG. 6 is a front view of the striking tool head assembly of the present invention.
Figure 8:
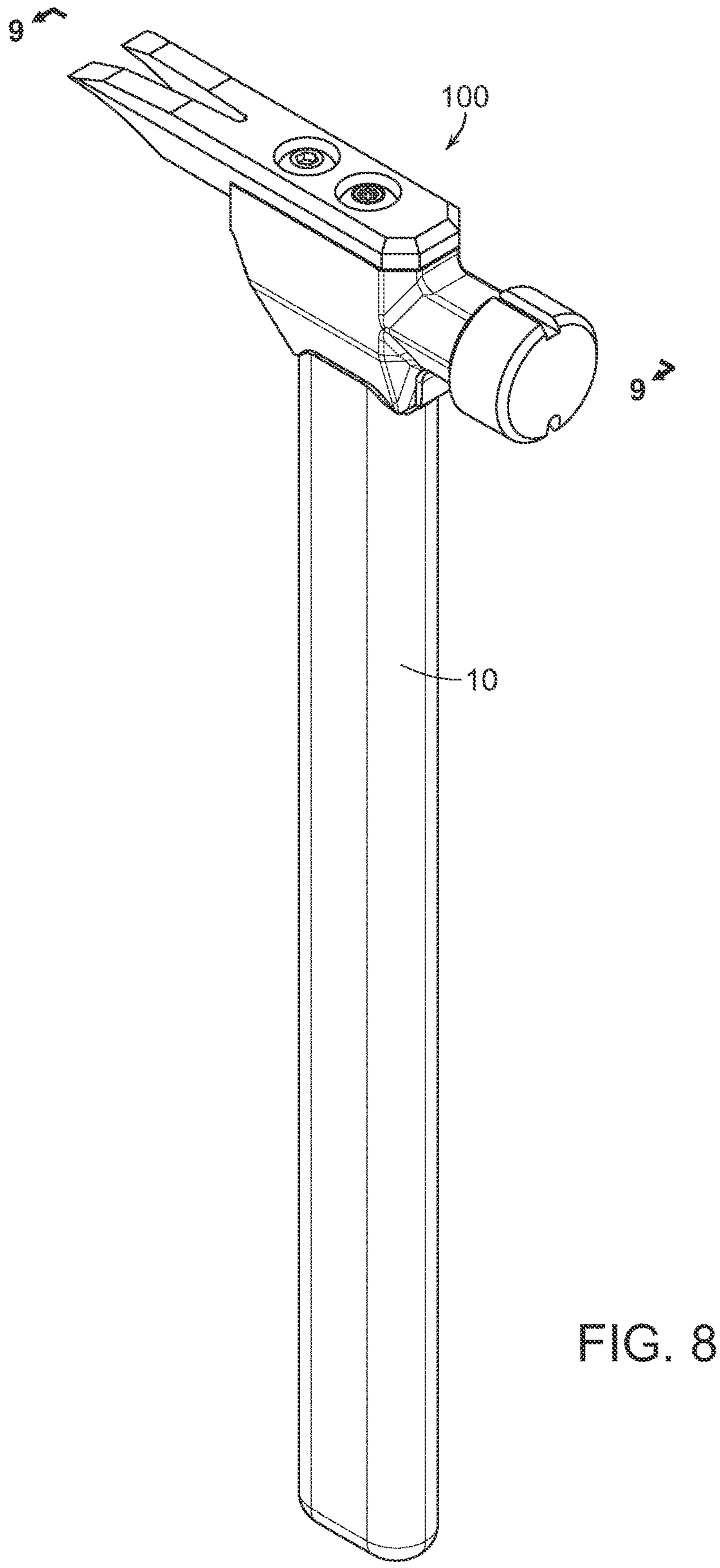
FIG. 8 is a side perspective view of the striking tool head assembly connected to a handle, in accordance with the present invention.
Figure 12:
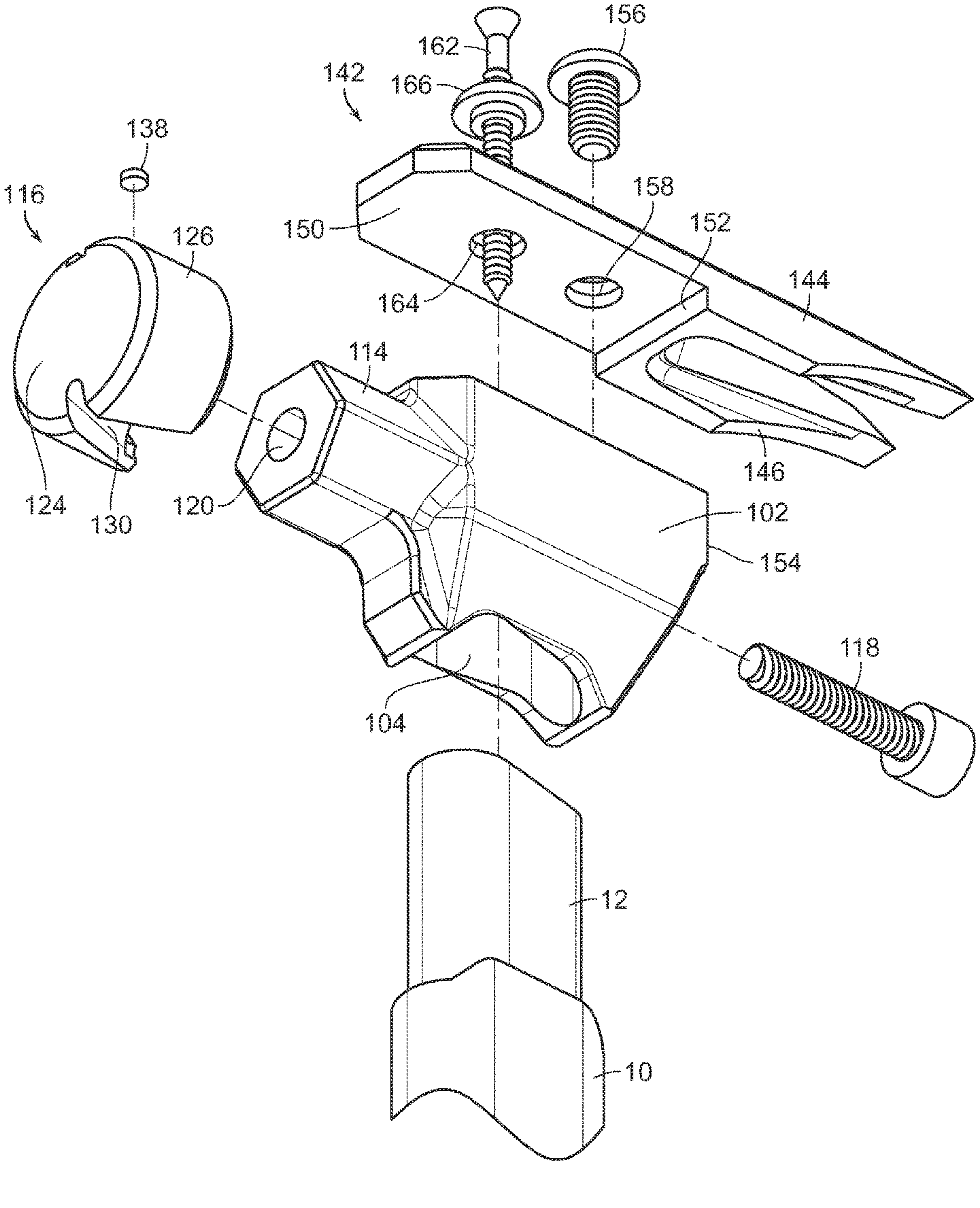
FIG. 12 is a lower side perspective view similar to FIG. 11.
Figure 13:
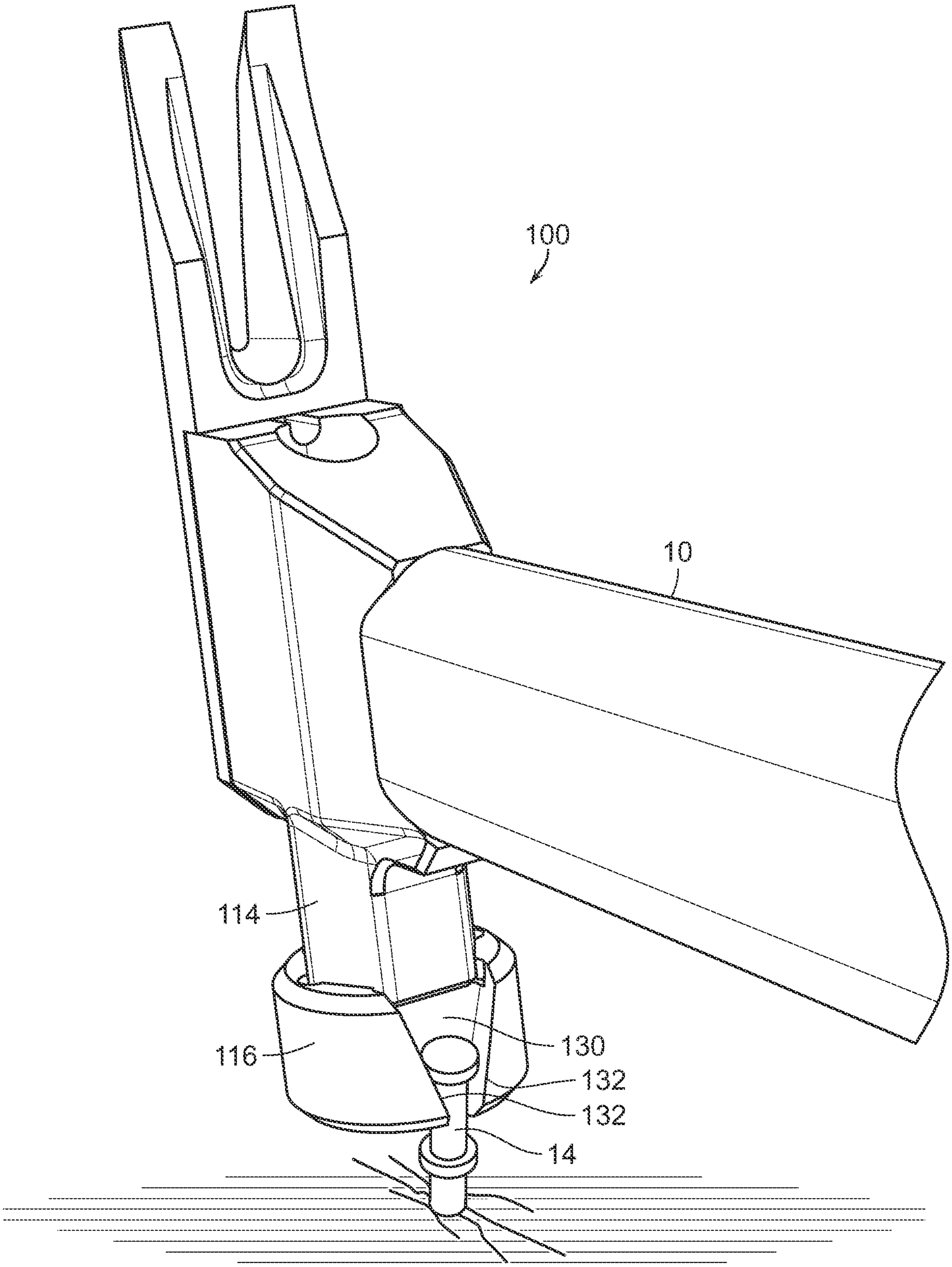
FIG. 13 is a perspective view illustrating removal of a nail, using a nail puller of the striking member, in accordance with the present invention.

With reference now to FIGS. 2, 5 and 12, the striking member 116 may include a notch 130 formed in the peripheral surface thereof, such as in the striking member perimeter wall 126, typically at a lower end thereof, having opposing edges which define a nail or other fastener puller. As illustrated, the edges may taper or diverge from one another such that the notch 130 is larger at one end and smaller at a generally opposite end to accommodate different sized fastener heads or other objects to be removed by the nail puller notch 130. Typically, as illustrated, the edges 132 and 134, as illustrated in FIG. 5, are spaced apart from one another at a rear surface of the striking member 116 and converge towards one another towards the face 124 of the striking member 116. Having a nail puller notch 130 formed in the striking head 116 can provide convenience to the user of the striking tool, for example, when one needs to pull nails or other fasteners out of a wall the striking member 116 can simply be brought down over the nail head and then the striking tool pivoted and rotated so as to pull the nail out of the wall or other object, as illustrated in FIG. 13.

Figure 4:
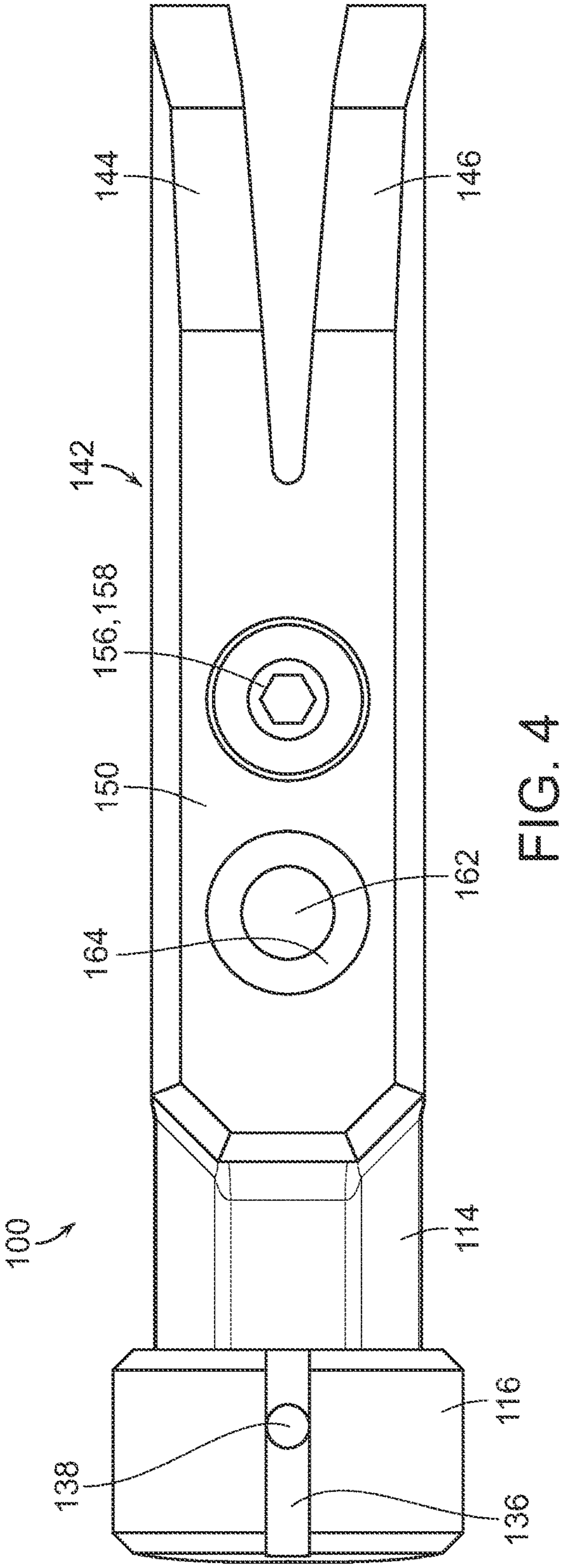
FIG. 4 is a top plan view of the striking tool head assembly of the present invention.
Figure 11:
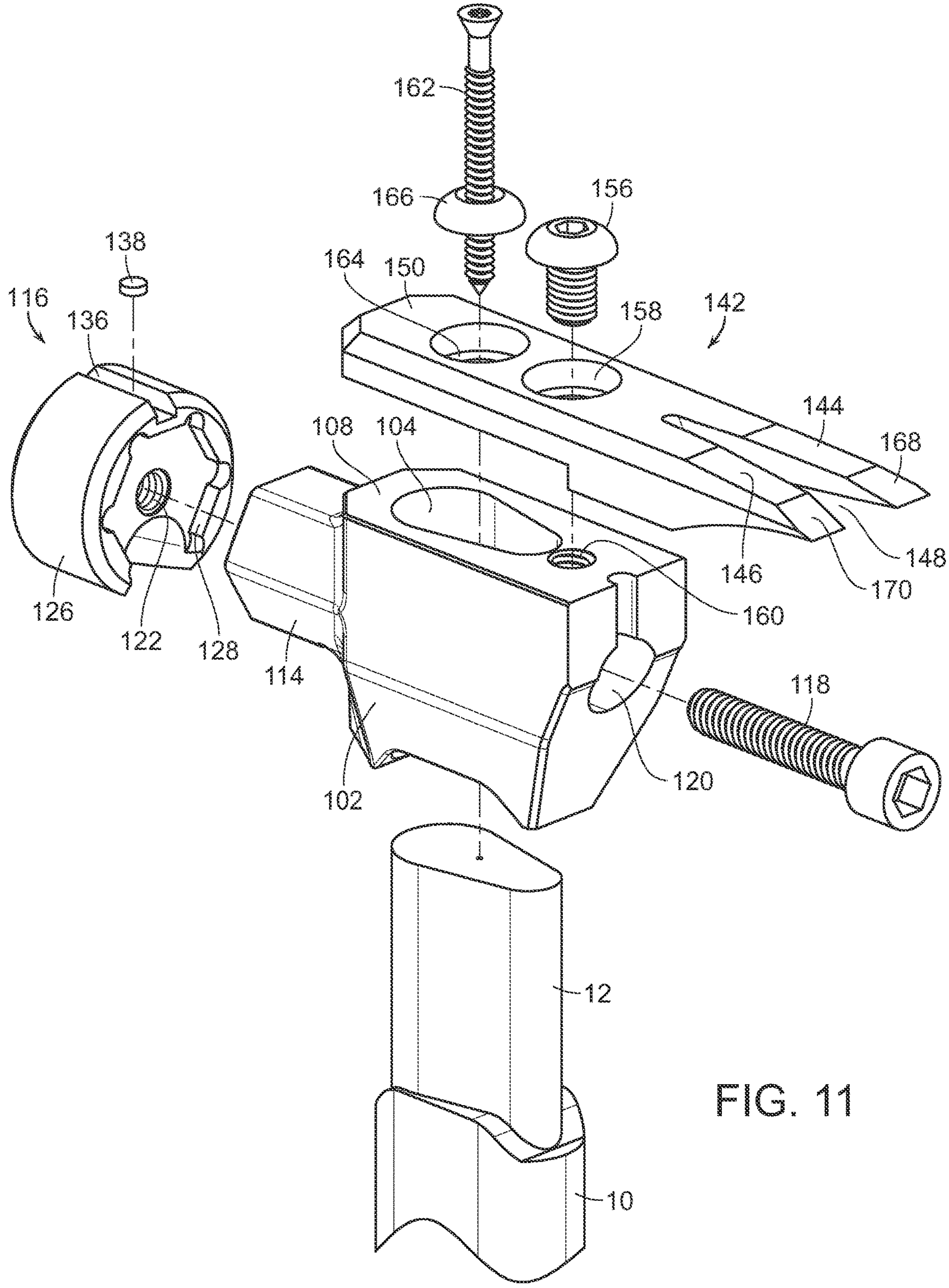
FIG. 11 is an exploded perspective view of the components of FIG. 10.
Figure 14:
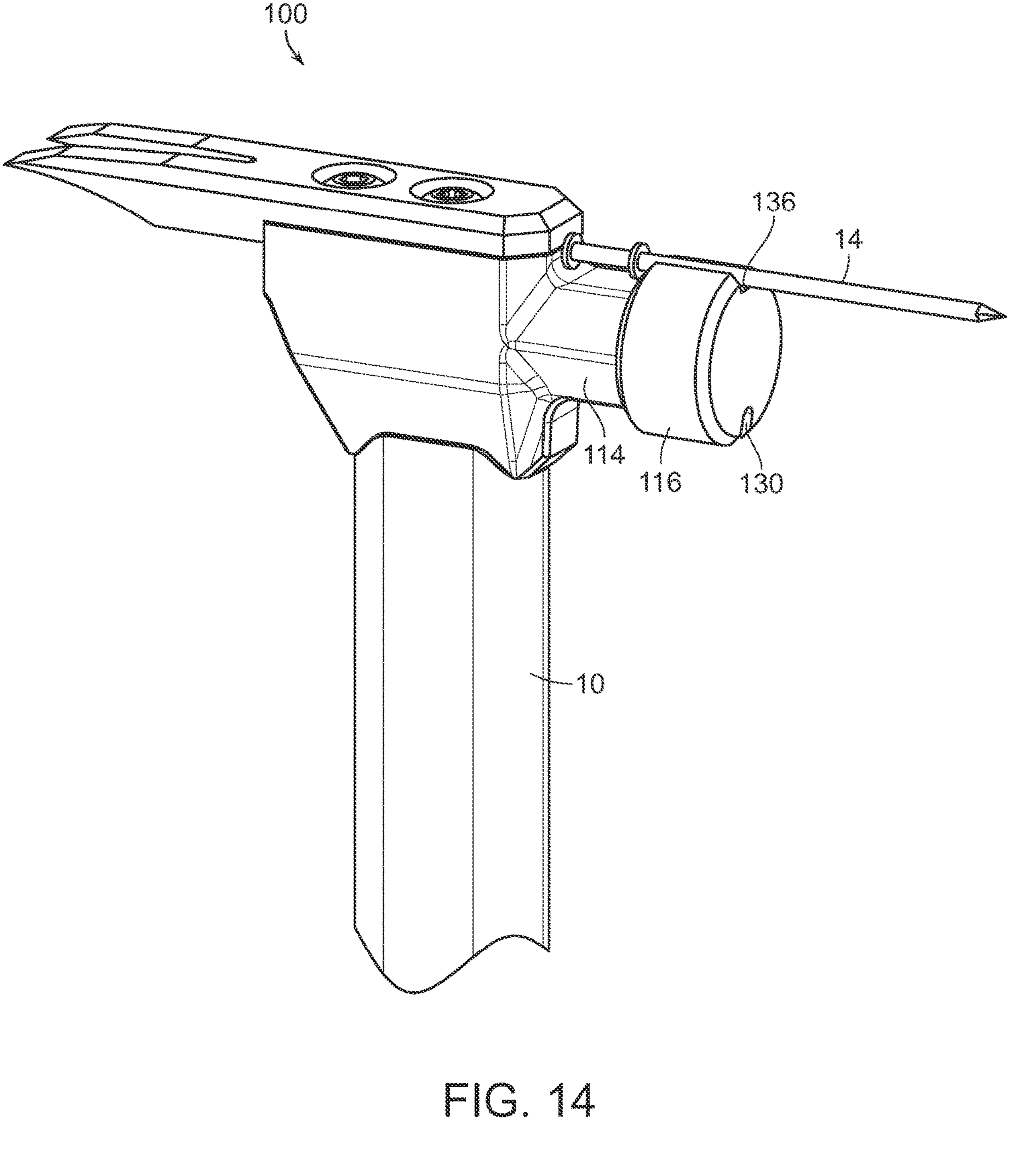
FIG. 14 is a perspective view illustrating a nail disposed within a setting groove of the striking member, in accordance with the present invention.

With reference now to FIGS. 1, 4 and 11, the striking member 116 may also include a nail setting slot 136. The slot 136 may be formed in a peripheral surface of the striking member 116, such as in an upper portion of the peripheral wall or apron 126, as illustrated. The slot is sized and configured so as to receive a nail 14 therein, as illustrated in FIG. 14. A nail 14 may be inserted into the slot 136 as a preliminary step before applying a large amount of force through the striking member 116 to set the nail 14 in place in the object into which it is to be inserted. A magnet 138 may be associated with the slot 136 for retaining the nail 14 within the slot 136. As illustrated, the magnet 138 may be disposed within an aperture or a recess 140 formed in the striking member 116, such as at a bottom surface of the slot 136. The magnet 138 will serve to hold the metal nail 14 in place until the nail 14 is hammered initially into the object into which it is to be placed. Afterwards, the full force of the striking tool can be used to hammer the nail 14 into the object to drive it fully into the wall or object, such as by striking the head of the nail 14 with the striking member 116.

With reference to FIGS. 1-4 and 8-12, a claw member 142 is detachably connected to an upper surface of the head body 102. The claw member 142 includes first and second elongated claw portions 144 and 146 which are spaced apart from one another by an open-ended gap 148. Preferably, the gap 148 between the first and second claw portions 144 and 146 narrows from a free end of the claw portions 144 and 146 and forms a fastener puller. The claw portions 144 and 146 extend away from the head body 102 when the claw member is attached to the head body 102, as illustrated.

In the prior art, the claw portion of a typical hammer has a nail pulling slot or gap, but the claw members typically extend having an initial thickness of approximately half an inch and are narrowed down to approximately an eighth of an inch, and the claw members are elongated and curved. A disadvantage of such an arrangement is that when a large amount of pressure is applied to the claws, they may bend or break. Accordingly, the claw portions 144 and 146 are of a thickness and/or width so as to resist bending or breaking. Another difference in the claw members 144 and 146 as compared to prior art claw members, which typically form an arc along the length thereof to a relatively thin outer edge, is that the claw members 144 and 146 of the present invention have ends which are formed at an acute angle with respect to the generally planar surface of the head. This enables the claw portions 144 and 146 to serve more as a crowbar or prybar when removing nails or other objects. The flat faces 168 and 170 act as a fulcrum for applying leverage to remove the nail or other object. When the claw portions 144 and 146 are forcibly inserted into an object, such as a drywall or other such object, removal of the claw portions 144 and 146 from the object is also facilitated due to the configuration illustrated and described above.

The claw member 142 includes a platform portion 150 generally opposite the claw portions 144 and 146. The platform portion 150 is configured so as to rest upon the upper surface 108 of the head body 102. Typically, as illustrated, the upper surface 108 of the head body 102 is generally planar and the lower surface of the platform 150 is also planar and sized so as to be placed upon the upper surface 108 of the head body 102. Typically, as illustrated, the platform portion 150 is also generally planar on an upper surface thereof as well. As such, the platform portion may be disposed and lay on the head body 102.

The claw member 142 may include a ledge 152 between the platform portion 150 and the first and second claw portions 144 and 146. The ledge 152 may abut a rear surface 154 of the head body 102. Typically, as illustrated, the ledge 152 is formed at a normal or right angle in the platform member 142 and a portion of the rear of the head body is generally flat such that the ledge 152 can abut thereto.

The platform member 142 is detachably connected to the head body 102. This may be, for example, by means of a claw member fastener 156, such as the illustrated bolt, which passes into and through aperture 158 of the claw member 142 and into aligned aperture 160 formed in the head body 102. Typically, the aperture 160 will have internal threads so as to accept the external threads of the bolt or other fastener 156. Aperture 158 may be formed through the platform 150 and aperture 160 formed in an upper surface of the head body 102, as illustrated.

While the end 12 of the handle 10 may be frictionally fit within the cavity 104 of the head body 102, thus attaching the handle 10 to the striking tool head assembly 100, in a particularly preferred embodiment, the handle 10 is also detachably connected to the assembly 100 by additional means. This may include a fastener extending through the striking tool head assembly 100 and into the end 12 of the handle 10 which extends into the head body 102.

This may be by, as illustrated, a handle fastener 162 extending through the striking tool head assembly 100, such as through aperture 164 formed in the platform portion 150 of the claw member 142 and into the second end 12 of the handle, as illustrated in FIG. 9. The handle 10 may be comprised of wood, or other material, which is capable of receiving a fastener, such as a wood screw or the like, therein. The fastener 162 may pass through a ring member 166, which resides within a recess of the aperture 164 so as to be securely held in place within the aperture 164 and apply a fastening pressure between the platform 150 and the second end of the handle 12. Thus, fastener 162 not only attaches the striking tool head assembly 100 to the second end 12 of the handle 10, but also further secures the claw member 142 to the head body 102.

If the handle 10 becomes damaged during use, fastener 162 and ring 166 can be unfastened, and the handle 10 removed and a new handle inserted into the striking tool assembly 100 and fastened thereto, as described above.

Similar to the striking member 116, if the claw portions 144 and/or 146 become damaged during use, the claw member 142 may be detached from the assembly 100, such as detaching it from the head body 102 and replacing it with a new claw member 142. Moreover, claw members having different configurations, such as having claw portions of different sizes, lengths, or even other attachments may be used by merely attaching the claw member 142 to the head body 102 to form the assembly 100. Thus, not only may the handle 10 be replaced, but other portions of the assembly 100, such as the striking member 116 and claw member 142 may be changed as needed or desired.

Although several embodiments have been described in detail for purposes of illustration, various modifications may be made without departing from the scope and spirit of the invention. Accordingly, the invention is not to be limited, except as by the appended claims.

What is claimed is:

1. A striking tool head assembly detachably connected to a handle, comprising:
- a head body having an open-ended internal cavity configured to receive an end of the handle therein;
- a striking portion extending from the head body;
- a striking member detachably connected to a free end of the striking portion; and
- a claw member detachably connected to an upper surface of the head body, the claw member defining spaced apart first and second elongated claw portions extending away from the head body generally opposite the striking member, wherein the claw member includes a platform portion disposed on an upper surface of the head body, and wherein the platform portion of the claw member includes an aperture through which a handle fastener extends into an end of the handle disposed within the cavity of the head body.

2. The striking tool head assembly of claim 1, wherein the internal cavity of the head body extends from a bottom surface to a top surface of the head body.

3. The striking tool head assembly of claim 1, including a passageway that extends through the head body and the striking portion configured to receive a striking member fastener therethrough for detachably connecting the striking member to the striking portion of the head body.

4. The striking tool head assembly of claim 1, wherein the striking member has a striking face and a perimeter apron wall that extends therefrom and over an end portion of the striking member when the striking member is attached to the striking portion.

5. The striking tool head assembly of claim 1, wherein the striking portion has a multi-faceted exterior surface and the striking member has a corresponding internal multi-faceted surface so as to fit over the striking portion.

6. The striking tool head assembly of claim 1, wherein the striking member has a slot formed in a peripheral surface thereof configured to receive a nail therein, and a magnet associated with the slot for retaining the nail within the slot.

7. The striking tool head assembly of claim 1, wherein the striking member includes a notch having opposing edges formed a peripheral surface of the striking member that forms a fastener puller.

8. The striking tool head assembly of claim 1, wherein the platform portion has an aperture through which a claw member fastener extends into an aligned aperture of the head member for fastening the claw member to the head body.

9. The striking tool head assembly of claim 1, wherein the claw member includes a ledge between the platform and the first and second claw portions that abuts a rear surface of the head body.

10. The striking tool head assembly of claim 1, including a gap between the first and second claw portions that narrows from a free end of the claw portions and forms a fastener puller.

11. A striking tool head assembly detachably connected to a handle, comprising:

a head body having an open-ended internal cavity configured to receive an end of the handle therein;

a striking portion extending from the head body;

a striking member detachably connected to a free end of the striking portion;

a passageway that extends through the head body and the striking portion configured to receive a striking member fastener therethrough for detachably connecting the striking member to the striking portion of the head body; and a claw member detachably connected to an upper surface of the head body, the claw member defining spaced apart first and second elongated claw portions extending away from the head body generally opposite the striking member;

wherein the striking member includes a notch having opposing edges formed a peripheral surface of the striking member that forms a fastener puller; and wherein the striking portion has a multi-faceted exterior surface and the striking member has a corresponding internal multi-faceted surface so as to fit over the striking portion;

wherein the claw member includes a platform portion disposed on an upper surface of the head body; and wherein the platform portion of the claw member includes an aperture through which a handle fastener extends into an end of the handle disposed within the cavity of the head body.

12. The striking tool head assembly of claim 11, wherein the internal cavity of the head body extends from a bottom surface to a top surface of the head body.

13. The striking tool head assembly of claim 11, wherein the striking member has a slot formed in a peripheral surface thereof configured to receive a nail therein, and a magnet associated with the slot for retaining the nail within the slot.

14. The striking tool head assembly of claim 11, wherein the striking member has a striking face and a perimeter apron wall that extends therefrom and over an end portion of the striking member when the striking member is attached to the striking portion.

15. The striking tool head assembly of claim 11, wherein the platform portion has an aperture through which a claw member fastener extends into an aligned aperture of the head member for fastening the claw member to the head body.

16. The striking tool head assembly of claim 11, wherein the claw member includes a ledge between the platform and the first and second claw portions that abuts a rear surface of the head body.

17. A striking tool head assembly detachably connected to a handle, comprising:

a head body having an open-ended internal cavity configured to receive an end of the handle therein;

a striking portion extending from the head body;

a striking member detachably connected to a free end of the striking portion; and a claw member detachably connected to an upper surface of the head body, the claw member defining spaced apart first and second elongated claw portions extending away from the head body generally opposite the striking member;

wherein the claw member includes a platform portion disposed on an upper surface of the head body;

wherein the platform portion has a first aperture through which a claw member fastener extends into an aligned aperture of the head member for fastening the claw member to the head body; and wherein the platform portion of the claw member includes a second aperture through which a handle fastener extends into an end of the handle disposed within the cavity of the head body.

18. The striking tool head assembly of claim 17, wherein the internal cavity of the head body extends from a bottom surface to a top surface of the head body.

19. The striking tool head assembly of claim 17, including a passageway that extends through the head body and the striking portion configured to receive a striking member fastener therethrough for detachably connecting the striking member to the striking portion of the head body.

20. The striking tool head assembly of claim 17, wherein the striking member has a striking face and a perimeter apron wall that extends therefrom and over an end portion of the striking portion when the striking member is attached to the striking portion.

21. The striking tool head assembly of claim 17, wherein the striking portion has a multi-faceted exterior surface and the striking member has a corresponding internal multi-faceted surface so as to fit over the striking portion.

22. The striking tool head assembly of claim 17, wherein the striking member have a slot formed in a peripheral surface thereof configured to receive a nail therein, and a magnet associated with the slot for retaining the nail within the slot.

23. The striking tool head assembly of claim 17, wherein the striking member includes a notch having opposing edges formed a peripheral surface of the striking member that forms a fastener puller.

24. The striking tool head assembly of claim 17, wherein the claw member includes a ledge between the platform and the first and second claw portions that abuts a rear surface of the head body.

* * * * *